Patented Aug. 30, 1949

2,480,761

UNITED STATES PATENT OFFICE 2,480,761

PROCESS OF RECOVERING FUR, HAIR, OR WOOL FROM HIDE SCRAPS AND SKINS

Michael Mulqueen, Walden, N. Y., assignor to Hatters Fur Exchange, Inc., Walden, N. Y., a corporation of New York No Drawing. Application September 14, 1945, Serial No. 616,463

9 Claims. (Cl. 195—6)

1

The present invention relates to the recovery of animal fibers, such as fur, hair, or wool, from various by-products of the fur industry and more especially the recovery of such animal fibers from heads, paws, tails, dressing pieces and various types of fur waste which requires removal of skin particles in order to salvage the fur and hair, as animal fibers for use in textiles.

It appears that the pelts of animals in the natural state comprises three layers, namely, the flesh side or the side cut from the body of the animal which is a layer of serus tissue or fatty material that may be removed by scraping. The next layer is collagen, and the outer layer is the epidermal layer or outer skin tissue. The protective covering, fur and hair, of the animal is imbedded in the thin epidermal layer and protrudes through this layer into the collagen layer. The root of the hair or fur forms a sort of sack bulging into the collagen layer and surrounded and gripped by the epithelium tissue comprising the epidermal layer.

The problem of recovering the fur and hair comprises the removal of the collagen and the epithelium tissue without destroying the fur or hair structure. The collagen and epithelium tissue may be removed by boiling in water, preferably water which is slightly acid, although it has been found that the fur and hair recovered are somewhat damaged by the usual boiling method. The removal of the collagen and epithelial tissue I have found may be accomplished by the use of enzymes with less damage to the fur and hair. The organic enzyme pepsin appears to have an optimum digestion point which is at pH 1 to 3 and is effective in a weak hydrochloric acid solution. This enzyme is consequently adaptable for the digestion of the hide comprising the collagen and epithelium.

After the stock of fur pieces have been subjected to the digestion process until the hide has disintegrated, it is desirable to stop the digestive action. It has been found that by heating the enzyme solution, after the required digestion period, to a boiling temperature for a short time, the enzyme was completely inactivated. In addition, particles of epithelial tissue remaining after the enzyme digestion were disintegrated. Then by rinsing the stock with two hot baths and scouring it with a mild soap and alkali bath (or by dry cleaning), the resulting product is free of nibs and is of substantially good quality.

The preferred process, based upon 100 pounds of stock treated, is substantially as follows:

Step 1.—100 pounds of fur pieces are soaked for substantially 24 hours in a .5 molar (1.825%) commercial hydrochloric acid solution at about 40° C. At the end of the 24 hours the liquid is allowed to run to waste, and the stock of fur and hair and skin pieces are carefully retained.

Step 2.—About 200 gallons of water are added to the retained material or stock from step 1 and the pH is checked to be sure that it is between 1 and 3. Sufficient pepsin (U. S. P. pure pepsin) is then added to produce substantially .1% pepsin in about 200 gallons of water solution which includes the stock. The stock is retained in this pepsin solution for a period of about 24 hours with a temperature at about 40° C. during which the hide is digested by the pepsin, leaving the fur and hair.

At this point in the process one of two procedures is followed: If the enzyme activation tests indicate the solution is still active, then the enzyme solution is saved and run off to storage and hot water is then added to the stock and this is heated up to a boiling point for about 5 minutes and run to waste. In the event that the enzyme solution shows very little enzyme activity or none at all, the enzyme solution is heated to a boil, with the stock therein, for about 5 minutes and then the solution is drained from the stock and allowed to run to waste. This boiling period inactivates the enzyme in contact with the stock.

Step 3.—The stock which is left, after the draining of the solution as specified in Step 2, is washed by about 200 gallons of boiling water which is run through the stock and the stock is drained. After the drainage, another 200 gallons of boiling water is run through the stock thus making two washing operations in which about 200 gallons of boiling water are used in each operation, making about 400 gallons of hot water in all that is run through the stock. The amount of wash water used is not critical, so long as the stock is thoroughly washed.

Step 4.—This is a scouring or cleaning step and may be carried out by the use of 200 gallons of hot water with 1% sodium carbonate (soda ash) together with .1% soap; or the stock, after the washing Step 3 has been performed, may be subjected to sufficient dry cleaning fluid to thoroughly clean the same. The dry cleaning fluids which are satisfactory for this purpose are the usual dry cleaning materials, such as trichlorethylene, stoddards-solvent, petroleum spirits, or any other efficient grease solvent which does not injure the fur and hair. In either case the stock and the cleaning liquid is agitated for about 20 minutes and the liquid drawn off. In the case of the soap method, the liquid is run to waste, whereas if dry cleaning liquids are used these are saved and run to storage.

*Step 5.*—The stock from Step 4 is now again subjected to a hot rinse step which is the same as Step 3, namely, two rinses with 200 gallons of boiling water for each rinsing operation.

*Step 6.*—The "handle" and "feel" of the finished product is improved by steeping the stock for 20 minutes to half an hour in a solution of water containing substantially .1% acetic acid and .1% "Triton K-60" (a quaternary organic ammonia compound). At the end of the period, the liquid is drawn off.

*Step 7.*—The damp stock is dried and agitated in such manner as to produce substantially dry fur and hair. At this stage it will be found that the clean fur and hair are substantially free from all skin tissues which have been dissolved and have disappeared.

Referring back to Step 1, the time can be cut down in this step by elevating the temperature or increasing the strength of the hydrochloric acid or both. For example, by using a 1 molar (3.65%) commercial hydrochloric acid solution and retaining the temperature at about 40° C., this step can be shortened to 6 hours. By keeping the solution strength at .5 molar and elevating the temperature to 70° C., this step can be shortened to substantially 1 hour. Fur stock has been treated successfully by using .05 molar (.182%) commercial hydrochloric acid solution and as high as 3 molar (10.95%) commercial hydrochloric acid solution. When using an acid range above 1 molar, the temperature should be lowered and carefully controlled so as to prevent excessive damage to the fur.

Where the Step 1 is shortened as stated, it has been found that Step 2 is automatically shortened in that with the 1 molar solution at 40° C. and Step 1 shortened to six hours, the Step 2 has been found to be completed in as short a time as 3 hours, and likewise where the solution was .5 molar commercial hydrochloric acid solution and the temperature elevated to 70° C., Step 2 was likewise completed within 3 hours. These accelerated operations do not, however, produce quite as good a finished material as do the preferred steps carried out during the longer periods of time as previously specified.

As to Step 2 it has been found that when the amount of pepsin present is increased, this increases the rapidity of digestion of the skin particles, but due to the expense or cost of pepsin the increasing of the pepsin enzyme would be impractical from a commercial standpoint. When the amount of pepsin is too low, the saturation point is reached too rapidly, and when this point is reached the enzyme activity stops and the skin particles may not be fully digested. It has been found that the .1% enzyme solution is satisfactory and can be used for two and in some bases 3 batches of stock. The pepsin enzyme has been used in solution with water in ranges from .1% to 1% of pepsin in solution. The preferred percentage as above stated, namely, .1% appears to be of sufficient strength to operate successfully on a commercial scale.

The present method is known as a "stripping" process as distinguished from boiling methods which have heretofore been used. The stripped fur and hair is stronger, longer, less affected by the processing, has a better feel, is more nearly the original color, is less brittle and freer from nibs, than is the stock produced by boiling processes heretofore known in the art.

It is to be understood that exact time periods, specific amounts of materials, and definite temperatures herein given are to be understood as being approximate and not absolutely critical.

I claim:
1. The process of recovering animal fibers from hide, comprising: subjecting the hide to a pepsin water solution having a pepsin strength of from .1% to 1%, in the presence of hydrochloric acid until the hide has gone into solution, and then separating the fibers from the solution.

2. The process of recovering animal fibers for use in textiles from hide scraps, comprising: subjecting the hide scraps to a .05 molar to 3 molar hydrochloric acid solution for substantially twenty-four hours at a temperature of substantially 40° C., and then to a solution of pepsin in water acidified with hydrochloric acid, until the hide portion of the scraps has gone into solution, and separating the animal fibers from the solution.

3. The method of recovering animal fibers from hide, comprising: subjecting the hide to a water solution of pepsin and hydrochloric acid having a pepsin strength of from .1% to 1%, then inactivating the pepsin by boiling the solution, and then separating the fibers from the solution.

4. The process of recovering animal fibers from hides, comprising: subjecting the hides to a water solution of hydrochloric acid of a strength of .05 molar to 3 molar and maintained at substantially 40° C., then separating the hides from the acid solution, then subjecting the hides to a solution, maintained at substantially 40° C., of .1% to 1% pepsin in water acidified with hydrochloric acid, until the hide tissue has been disintegrated, and then rendering inactive by heat the pepsin solution in contact with the fibers.

5. The process of recovering animal fibers from hides, consisting of: subjecting the hides to a water solution of hydrochloric acid of a strength of .05 molar to 3 molar for a period of at least about six hours, then subjecting the hides to a solution, maintained at substantially 40° C. of 0.1% to 1% pepsin in hydrochloric acid solution having a pH value between 1 and 3 until the tissue has become disintegrated and then boiling the pepsin-acid solution briefly to inactivate the pepsin and further disintegrate the tissue.

6. The process as claimed in claim 5, wherein the recovered animal fibers are then scrubbed with a sodium carbonate-soap-water solution.

7. The process of recovering animal fibers from hide, comprising subjecting the hide to a hydrochloric acid solution, then subjecting the hide to a .05 to 3 molar hydrochloric acid water solution having .1% to 1% pepsin present until the hide tissue has been disintegrated, then separating the fibers from said last-mentioned solution, and then boiling the fibers in water to deactivate any pepsin still in contact with the fibers and liberate fibers from any remaining particles of hide.

8. The process of recovering animal fibers from hide, comprising subjecting the hide to a hydrochloric acid solution, then subjecting the hide to a .05 to 3 molar hydrochloric acid water solution having .1% to 1% pepsin present until the hide tissue has been disintegrated, and then boiling said last-mentioned solution to deactivate the pepsin in contact with the fibers and liberate fibers from any remaining particles of hide.

9. The process of recovering animal fibers from hide, comprising: subjecting the hide to a water solution of hydrochloric acid of a strength of .05 to 3 molar for a period of at least six hours, then subjecting the hide to a solution, maintained at substantially 40° C., of .1% to 1% pepsin in hydrochloric acid and water and having a pH value between 1 and 3 until the tissue has become disintegrated, then separating the fibers from said last-mentioned solution, and then boiling the fibers in water briefly to inactivate any pepsin in contact with the fibers and further disintegrate the tissue.

MICHAEL MULQUEEN.

REFERENCES CITED

The following references are of record in the file of this patent:

UNITED STATES PATENTS

| Number | Name | Date |
| --- | --- | --- |
| 957,316 | Dyck | May 10, 1910 |
| 1,405,741 | Rohm | Feb. 7, 1922 |
| 2,289,993 | Pfannmuller et al. | July 14, 1942 |
| 2,362,540 | Conquest et al. | Nov. 14, 1944 |
| 2,363,646 | Conquest et al. | Nov. 28, 1944 |